United States Patent
Palmer

[15] 3,645,747
[45] Feb. 29, 1972

[54] METHOD OF PRODUCING A SIMULATED MEAT

[72] Inventor: Hugh C. Palmer, Pacific Palisades, Calif.
[73] Assignee: Kal Kan Foods, Inc., Vernon, Calif.
[22] Filed: July 25, 1969
[21] Appl. No.: 845,070

[52] U.S. Cl. ............................................................99/17
[51] Int. Cl. ...........................................................A23j 1/14
[58] Field of Search ..........................................99/14, 17, 2

[56] References Cited

UNITED STATES PATENTS

| | | | |
|---|---|---|---|
| 3,197,310 | 7/1965 | Kjelson | 99/17 |
| 3,142,571 | 7/1964 | McAnelly | 99/14 |

Primary Examiner—A. Louis Monacell
Assistant Examiner—William A. Simons
Attorney—Davis, Hoxie, Faithfull & Hapgood

[57] ABSTRACT

An edible product simulating meat in texture and appearance composed in major part of a vegetable protein mass having an internal structure stretched into the form of fibers, filaments and tissuelike membranes coagulated from a viscoelastic state to stable attenuated form. In making the product, a slurry with water of a vegetable protein material having viscoelastic properties similar to those of vital wheat gluten is heated to reduce the permeability to gases of the exposed surface of the material by coagulation thereof, after which the material is treated to generate gases internally of the mixture and to cause the gases to expand while their escape is inhibited by the lower permeability of the said surface so that the mixture enlarges in volume and becomes internally attenuated, after which the attenuated mixture is coagulated to a denatured product.

7 Claims, No Drawings

METHOD OF PRODUCING A SIMULATED MEAT

This invention relates to simulated meat prepared from a heat coagulable vegetable protein material having viscoelastic character similar to that of vital wheat gluten.

As is known, wheat gluten is a complex mixture of water insoluble proteins obtained as a residue following water extraction of wheat flour from which it is isolated as a creamy-colored coherent smooth rubberlike wet mass which has considerable extensibility. Freshly extracted wet wheat gluten possessing a large water content is then in its most active elastic state. In commercial production the impure gluten is dried and marketed as a fine powder which may then be restored to an active state by admixture with water. The term vital wheat gluten is used to described forms of concentrated dried wheat gluten which have been subjected to a minimum of heat denaturation during drying and which, consequently, possess on reconstitution with water at least to some degree the wet state extensible properties of freshly prepared wet wheat gluten.

In preparing the present simulated meat food product, I employ a slurry in water of a heat coagulable vegetable protein having viscoelastic character similar to that of vital wheat gluten. Preferably the slurry is prepared by admixture of vital wheat gluten with water. Alternatively, the wet wheat gluten freshly prepared as a residue following water extraction of wheat flour may be used.

The slurry is placed in a container suitable by heat processing, the container being filled to a predetermined depth. In a short time the slurry, if prepared from dried vital wheat gluten admixed with water, will thicken as the result of inhibition of water by the gluten until the mass becomes a soft dough, viscoelastic in nature. The dough is introduced into a heating chamber where it is heated. Coagulation takes place on the surface of the dough, thereby forming a filmlike skin encasing the dough in its upper surface. As the heating continues, gases (largely water vapor) are evolved, which, however, cannot escape due to the impermeability of the surface skin that has been formed. Thus internal expansive pressure is generated which causes the skin to rise. The vegetable protein body, being elastic, becomes pulled out vertically as the skin rises to form fibers, filaments and membranes of material. After the protein body has expanded to a desired level, further heat is applied to coagulate the gluten in the stretched position and thus permanently fix the fibers, filaments and membranes forming the internal configuration of the heated gluten. On cooling, the stretched fibers, filaments and membranes become compacted due to condensation of the entrained gases with a resultant increase in density to yield a formed product possessing textural and visual characteristics similar to those of natural meats. The present simulated meat is also found to possess absorptive properties which usefully serve to retain additive materials within the matrix of the prepared product as may be supplied for altering its flavor, visual appearance, and textural or structural properties. These additives may be included in the initially formed slurry for contributing desirable properties to the finally prepared product, or such additives may be absorbed or injected into the prepared product. If desired, a further heat processing stage may be carried out as hereinafter described in greater detail.

The present simulated meat may be prepared by initially combining a heat coagulable vegetable protein having viscoelastic properties identical with or similar to those of vital wheat gluten in an amount from about 15 to about 45 percent by weight, and preferably in an amount from about 25 to about 35 percent by weight, with about 55 to about 85 percent by weight of water and preferably to a water content of about 65 to 75 percent by weight. The gluten and water are mixed to form a substantially uniform slurry. It is found that the addition of heat coagulable vegetable protein to an excess amount of water forms a thin liquid slurry which would not thicken to a dough on standing and which would result, upon heating, in an overly soft product texturally, whereas the addition of an excess amount of heat coagulable protein in forming the slurry results in a stiff and resistant dough which is difficult to handle and which forms an exceedingly tough and rubbery product upon heating.

The heat coagulable vegetable protein addition may be partially replaced by either a vegetable or animal protein factor, providing such substitution does not result in loss of the required viscoelastic characteristics of vital wheat gluten found necessary for formation of the present product. Typically, vegetable proteins of oilseed or legume origin such as soy bean, cotton seed, peanut, safflower and rape seed proteins or the like; and animal-derived proteins, such as meat and fish protein or milk-based proteins such as casein or the like, may replace part of the heat coagulable vegetable protein if desired. These proteins need not be highly purified. When incorporated with the gluten dough prior to heating, these materials may be included in amounts up to about 15 percent by weight, and desirably in an amount from about 6 to about 12 percent by weight. All the additive materials herein described may, however, alternatively be subsequently added by absorption or injection into the simulated meat of my invention as a matrix, in which case substantially higher levels of incorporation may be achieved.

Although not exhaustive, the following additives have been found to be useful.

Blood and blood derivatives are particularly useful for conferring meaty appearance to simulated meat of this invention. Blood may be added either as whole blood, blood serum or blood plasma, all of which may be used fresh or cooked, with or without anticoagulant additives, or in reconstituted dried form. A blood additive is typically used in an amount up to about 35 percent by weight and desirably in an amount from about 10 percent to 25 percent, and preferably 20 percent by weight as a substitute for the same percent by weight of water. The blood factor may be substituted in whole or in part by aqueous fluids such, for example, as milk or milk derivatives containing components of whole, skim or reconstituted milk, whey or various additional protein-containing materials such as aqueous extracts of meat, fish or meat byproducts.

Meat or meat byproducts, or fish, or their extracts or fractions prepared by differential centrifugation of homogenates of the same materials, whether raw or precooked, may be added to the aqueous gluten slurry or injected in the prepared simulated meat. Such meats and meat derivatives are desirably added ground or homogenized in form. The meat or meat derivative factor may be added to the aqueous gluten slurry in an amount up to about 30 percent by weight and, desirably, in an amount from about 10 percent to about 30 percent by weight. By injecting meat and meat derivatives into the prepared simulated meat, substantially higher levels of incorporation can be achieved.

Particularly useful additives are sugars which may be employed to increase the osmotic pressure of the water phase with a resultant bacteriostatic effect according to the well-developed process used for production of semimoist foods. Sugars that may be employed in this connection include any of the reducing and nonreducing monosaccharides, disaccharides or polysaccharides and may include pentose as well as hexose sugars. The particular sugar that is to be used which most commonly would be sucrose, glucose or corn syrup may be substituted for water in the formula at levels up to 35 percent by weight of the product. Desirably sugars are incorporated in an amount from about 20 percent to about 30 percent by weight. At these levels sugars do not interfere with the fiber and membrane forming process.

It may be desirable to combine the use of sugars with the use of humectants such as hydrophilic polyhydric alcohols, for example propylene glycol, and antimicrobial agents, for example sorbic acid or its salts, to produce novel textured semimoist foods with extended shelf life properties. A bacteriostatic effect may also be produced in the simulated meat products of this invention by the use of acidulants according to well-known food preservation techniques. The use of acidulants may be combined, if desired, with the use of sugars, humectants and antimicrobial compounds in the production of uniquely textured semimoist foodstuffs.

When using sugars as additives, cooling is preferably carried out in a steam environment rather than hot air to avoid the brownish discoloration of the surface skin that is found to occur in hot air. However, the principle of fiber or membrane formation remains the same when using steam. After heat processing to produce fibers and membranes in the product, the product may be subjected if desired to partial dehydration by drying to increase the sugar solids. Semimoist textured gluten simulated meats prepared as described above are quite unique in appearance and are distinctly different from existing semimoist products. Suitably colored products are composed of translucent fibers and membranes having an almost identical appearance to that of raw muscle meat.

Various supplemental additives may be either included in the aqueous gluten slurry or injected into the prepared simulated meat product to improve the storage properties, nutrient value, texture, flavor and appearance of the simulated meat products of my invention, provided such addition does not destroy the desired viscoelastic properties of the dough. Although not exhaustive, one or more supplemental additives may be selected from one or more of the well-known classes of food additives comprising, for example, color and curing additives and pigments, enzymes, vitamins, mineral and amino acids, antimicrobial additives, antioxidants, and food stabilizers, acidulants, sequestrants, gums, sugars and starches, surface active agents, polyhydric alcohols and humectants, natural and synthetic flavorings, flavor potentiators and nonnutritive sweeteners. Supplemental additives may be incorporated at levels normally used in the food processing industry for purposes of improving nutritional value, consumer acceptance (animal or human), preservation of quality, processing, or for conferring specific qualities of shelf life.

Fats or oils may be added to the formulation if desired. If fats or oils are to be added, care must be taken however, that the fiber formation is accomplished in the absence of more than 2 percent or 3 percent ether extractable fats and oils, unless such fats or oils are rendered immiscible as by encapsulation or other techniques. Fats present as lipo-protein complexes similar to those normally present to some degree in extracted wheat gluten, which are characterized by being insoluble in normal fat solvents, do not interfere with the fiber and membrane formation process.

The vital wheat gluten, water, flavoring and coloring ingredients and other desired additives are mixed together either as a batch or continuously. The slurry is desirably formed using a hot water addition in order to raise the initial slurry temperature, thus reducing the cooking time necessary to form the textured simulated meat product.

A layer of slurry typically about three-quarters to about 1 inch in depth is deposited in a suitable container, although it is recognized that other thicknesses may be used, if desired. The slurry is heat processed, typically in a hot air oven, at a temperature of about 380° F. to about 430° F. for between 5 to 30 minutes, although higher or lower temperatures and times may be employed, if desired. For example, a satisfactory product may be prepared using a steam oven at a temperature of 212° F. for a processing time up to about 50 minutes, depending upon the layered thickness of the slurry to be used. Regardless of the type of heating employed, it is necessary and essential to the practice of the present invention that a surface skin be developed on the slurry to entrap, in situ, gases and vapors generated, as during heat processing. Whatever method of heating is employed, the internal temperature of the slurry will typically not exceed 250° F., although the skin temperature thereabout may be higher due to loss of moisture and its immediate proximity to the heating medium. The particular time and temperature for processing a three-quarter-inch deep slurry is approximately 20-30 minutes at 400° F. for a dough initially at room temperature, and approximately 15 to 20 minutes at 400° F. for a dough initially at 120° F. to 140° F. prepared with boiling water.

During the heating process, expansion of gas bubbles in the product and generation of steam within the dough causes the dough to rise and, because of the viscoelastic properties of the wheat gluten used, during the rising, fibers, filaments and expanded cellular structures are formed which extend substantially parallel to the direction in which the dough is rising. The further addition of heat coagulates the gluten in its stretched form so that elasticity is lost and the structure remains permanently stretched. If heating is not carried to the point of complete coagulation, the structure may retain too great a degree of elasticity so that it retracts on cooling to form a nonfibrous product. Alternatively, if application of heat is so rapid that the viscoelastic properties are destroyed prior to the dough being stretched into fibrous, filamentous and membranous structures, a nonfibrous product is also produced.

After the dough has been heat coagulated and allowed to cool, the product may be described as having an internal configuration including fibers generally described as elongated threadlike structures of tissue, interdisposed with filaments generally described as delicate fibers or threads, both of which are supported with membranes of thin layers of tissue. The fibrous areas of the material resemble muscle meat fibers whereas the membranous structures closely resemble animal connective tissues and membranes. The product presents textural characteristics very similar to natural meats having essentially a rubbery consistency. The prepared product is composed of partially and completely coagulated protein materials which may be further processed if desired.

The prepared simulated meat food product is found to possess a certain amount of porosity and is thus capable of absorbing or being injected with a wide variety of ingredients such as additives previously indicated. If it is desired to incorporate a liquid or semisolid material, the prepared simulated meat product may be squeezed in a bath of the material whereupon considerable uptake will occur following the principle of sponge absorption. The absorbed portion may be formulated to contain a substantial proportion of heat coagulable protein materials including egg, blood and homogenized meat ingredients and after absorption the spongelike product may be subjected to a second heating to coagulate those materials disposed in the liquid or semisolid phase. The second heating may be carried out by any conventional heating source, as desired. The product so prepared typically comprises areas of coagulated protein of homogeneous appearance intermixed in a fibrous matrix giving the appearance of organ meats such as those of liver and spleen. The fibrous and nonfibrous areas differ in densities providing textural variations to the bite during consumption.

The absorbed material may further include a sugar component, if desired, or may include additives previously indicated.

The following are typical examples:

EXAMPLE I

A high protein simulated meat is prepared by combining the following materials in the amounts indicated:

| INGREDIENTS | Percent by Weight |
| --- | --- |
| Vital Wheat Gluten | 29.04 |
| Water (195° F.) | 48.39 |
| Fresh Beef Blood (anticoagulant added) | 21.78 |
| Sodium Nitrite Solution (2% aqueous solution) | 0.26 |
| Titanium Dioxide (food grade) | 0.53 |
| | 100.00 |

The hot water, fresh blood, sodium nitrite solution and titanium dioxide are slurried together with stirring for approximately 1 to 2 minutes to form substantially homogeneous mixture. The vital wheat gluten is then added with continued mixing, after which mixing is continued until a satisfactory discharge of the gluten is effected to form a substantially homogeneous slurry. The slurry has a consistency like thin dough and may be characterized as being soft and pliable. A layer of dough about three-quarter inch in depth is deposited onto a standard baking tray and the tray is transferred to a hot air oven preheated to about 400° F. During the first few minutes of heating, a surface skin on the slurry is observed to form which gradually commences to rise as the heating is continued. After about 15 minutes of heating, the skin is observed to have risen over the whole surface of the tray to a height of about 2½ to 6 inches. Heating is continued for about 5 minutes to effect coagulation of the stretched protein filaments and membranes within the skin encased structure, after which time the product is removed from the oven and permitted to cool for a period of about 5 minutes. The partially cooled product may then be cut into 3/4-inch cubes and allowed to cool further to ambient temperatures. The yield of finished product is observed to be approximately 90 percent of the starting material and the content of the product, upon close examination, is found to resemble cooked muscle meat in color, general appearance and texture and includes adherent connective membranes with fibers and adjoining filaments.

EXAMPLE II

The procedure of EXAMPLE I is repeated to prepare a high protein simulated meat food product using the following ingredients in the amounts indicated:

| INGREDIENTS | Percent by Weight |
| --- | --- |
| Vital Wheat Gluten | 29.04 |
| Water | 61.70 |
| Fresh Beef Blood | 9.00 |
| Sodium Nitrite Solution (2% aqueous) | 0.26 |
| | 100.00 |

The above materials were processed substantially by the method of Example I and the final product was observed to resemble raw muscle meat, including connective tissue and membranes.

EXAMPLE III

The preparation of a flavored high protein simulated meat containing natural and synthetic flavoring materials was accomplished using the following ingredients in the amounts indicated:

| INGREDIENTS | Percent by Weight |
| --- | --- |
| Vital Wheat Gluten | 28.15 |
| Boiling Water (212° F.) | 46.90 |
| Reconstituted Spray Dried Blood | 21.11 |
| Sodium Nitrite Solution (2% aqueous) | 0.25 |
| Titanium Dioxide (food grade) | 0.53 |
| *Commercial Beef Flavor | 0.53 |
| Hydrolyzed Vegetable Protein | 2.19 |
| Monosodium Glutamate | 0.34 |
| | 100.00 |

*Compounded from essential oils.

The ingredients were metered, the flow rates corresponding to the relative amounts and ingredients shown above, into a continuous mixer where they were mixed simultaneously to form a flowable batter. The batter had a consistency of thin dough and was deposited into trays and continuously heat processed according to the procedure of Example I. The final product resembled cooked muscle meat and possessed a meaty aroma and taste.

EXAMPLE IV

In preparation of a simulated light meat product having a chicken flavor, the following components in the amounts indicated were combined:

| INGREDIENTS | Percent by Weight |
| --- | --- |
| Vital Wheat Gluten | 33.13 |
| Hot Water (195° F.) | 40.49 |
| Skim Milk | 24.85 |
| Titanium Dioxide | 0.61 |
| Commercial Chicken Flavor | 0.92 |
| | 100.00 |

The above ingredients in the amounts indicated were combined by the procedure of Example I. The prepared product bore a striking resemblance to cooked, light-colored muscle meat and possessed a meaty aroma and taste resembling that of chicken.

EXAMPLE V

A simulated meat product with natural meat flavoring is prepared including the following ingredients in the amounts indicated.

| INGREDIENTS | Percent by Weight |
| --- | --- |
| Vital Wheat Gluten | 33.21 |
| Boiling Water (100° C.) | 55.35 |
| Liver (ground ⅛ inches) | 11.07 |
| Sodium Nitrite Solution (2% aqueous) | 0.37 |
| | 100.00 |

The procedure of Example I is repeated in preparing the product of the present example except that the ground liver and water and nitrite solution were combined and thereafter brought to boil to coagulate the liver component prior to the addition to the vital wheat gluten. Thereafter, the materials were processed as indicated in Example I. The prepared product was found to possess marked resemblance to cooked natural meats and possessed a distinct liver aroma and taste.

EXAMPLE VI 49.84 percent by weight of fibrous simulated meat product prepared by the procedure of Example I were combined with 33.22 percent by weight of whole eggs, 12.46 percent by weight of fresh beef blood with anticoagulant, 4.15 percent by weight of wheat flour and 0.33 percent by weight of sodium nitrite solution (2 percent aqueous). A semisolid batter was prepared by mixing the whole egg, fresh blood, wheat flour, and sodium nitrite together. Thereafter, the fibrous simulated meat prepared by the procedure of Example I was immersed into the batter and squeezed gently to express entrained air bubbles. After soaking for about 1 to 5 minutes, the simulated meat was removed and allowed to drain for about 5 minutes. Thereafter, the simulated meat containing the semisolid batter was found to have absorbed an amount of the egg/blood/batter in an amount approximately equal to the weight of simulated meat. The spongelike simulated meat product was transferred to a shallow tray and processed in a steam oven at 212° F. After 15 minutes, the product was removed and allowed to cool. The product was obtained as firm, coagulated chunks of rubbery consistency having an external appearance of meat. On tearing the product, the interior was found to be composed of homogeneous areas of coagulated proteinaceous material joined together by a matrix of the coagulated gluten fibers. The overall appearance resembled that of organ meats, and, in particular, liver and spleen tissues.

The simulated meats of the present invention, useful as animal foods but also for human consumption, can, of course, be canned and can be processed in the same manner as natural meats and other high-protein foodstuffs, such as by drying or freezing.

What is claimed is:

1. The method of producing simulated meat which comprises forming an admixture of 55–85 by weight of an aqueous liquid comprising water with 45–15 by weight vital wheat gluten which, in such admixture, is viscoelastic and heat coagulable, depositing a quantity of the admixture in a manner to leave an upper surface free and exposed, applying heat to the admixture to form a surface filmlike skin on the exposed surface of the admixture by coagulation thereof, said skin having reduced permeability to gases formed during heating and expansion of the product, heating the admixture to form fibrous filaments within its internal structure by generating gases internally of the admixture and causing the gases to expand while their escape is substantially inhibited by the low permeability of said surface skin so that the admixture enlarges in volume and becomes internally stretched to form fibers and membranes by expansion of the mass in a direction normal to said exposed surface, and continuing the heating until a coagulation of the stretched mixture is effected.

2. The method as claimed in claim 1 which includes the further step of cooling the coagulated product to increase its density by contracting its volume.

3. The method of forming a simulated meat as defined by claim 1 including the further step of allowing the admixture to stand and thicken to a soft, pliable, extensible dough by the inhibition of water by the protein prior to heating.

4. The method as defined in claim 1 which includes the further step of utilizing the coagulated product for the spongelike absorption of an aqueous solution of heat coagulable protein materials consisting essentially of egg, blood and homogenized meat ingredients.

5. The method of forming a fibrous and membranelike edible product, which comprises forming an aqueous slurry of a coagulable viscoelastic vital wheat gluten which is adapted upon being expanded to form fibers and membranes, said slurry comprising 15 to 45 percent by weight vital wheat gluten and from 55 to 85 percent by weight of an aqueous liquid depositing a quantity of said slurry in a container in a manner to leave the upper surface free and exposed, coagulating the composition of the unconfined free surface by heating to form a filmlike skin thereon, expanding the inner composition by heating to move the coagulated surface away from an opposite surface and to form fibers and membranes by expansion of the mass in a direction normal to the exposed surface, and thereafter coagulating the fibers and membranes thus formed in the expanded mass by heating into a permanently set condition.

6. The method of producing simulated meat as defined in claim 5 in which the aqueous liquid comprises water and between 10 and 25 percent by weight based on the weight of the water of a liquid selected from the group consisting of blood, reconstituted blood derivatives, blood serum, blood plasma, milk and aqueous suspensions of edible solids.

7. The method as defined in claim 5 wherein the composition further has added thereto a substantial quantity of fats and oils.

* * * * *

UNITED STATES PATENT OFFICE
CERTIFICATE OF CORRECTION

Patent No. 3,645,747          Dated February 29, 1972

Inventor(s) Hugh C. Palmer

It is certified that error appears in the above-identified patent and that said Letters Patent are hereby corrected as shown below:

Column 7, line 16, after "55-85" insert -- % -- ; line 17, after "45-15" insert -- % -- . Column 8, lines 3 and 4, "inhibition" should read -- imbibition -- .

Signed and sealed this 31st day of October 1972.

(SEAL)
Attest:

EDWARD M. FLETCHER, JR.           ROBERT GOTTSCHALK
Attesting Officer                   Commissioner of Patents